(12) United States Patent
Kurz et al.

(10) Patent No.: US 6,221,175 B1
(45) Date of Patent: Apr. 24, 2001

(54) METHOD FOR THE PRODUCTION OF A CERAMIC LAYER ON A METALLIC BASE MATERIAL

(75) Inventors: Wilfried Kurz, St-Sulpice; Stèwes Bourban, Aproz; Heinrich Hofmann, Pully; Franz Jansen, Winterthur; Daniele Mari, Ecublens, all of (CH)

(73) Assignee: Sulzer Innotec AG, Winterthur (CH)

( * ) Notice: Subject to any disclaimer, the term of this patent is extended or adjusted under 35 U.S.C. 154(b) by 0 days.

(21) Appl. No.: 09/187,128

(22) Filed: Nov. 5, 1998

(30) Foreign Application Priority Data

Nov. 6, 1997 (EP) .................................................. 97810830

(51) Int. Cl.$^7$ .................................................. C23C 22/70
(52) U.S. Cl. .......................... 148/242; 148/512; 427/597
(58) Field of Search .................................... 148/242, 284, 148/285, 512, 567, 714; 427/596, 597

(56) References Cited

U.S. PATENT DOCUMENTS

| | | | |
|---|---|---|---|
| 4,106,782 | * | 8/1978 | Hyde et al. ........................... 277/235 |
| 4,576,874 | * | 3/1986 | Spengler et al. ...................... 428/623 |
| 4,732,778 | * | 3/1988 | Kawasaki ............................. 427/53.1 |
| 5,077,139 | * | 12/1991 | van der Heyden .................... 428/632 |
| 5,496,422 | * | 3/1996 | Morishige et al. ................... 148/525 |
| 5,985,056 | * | 11/1999 | McCay et al. ........................ 148/511 |

FOREIGN PATENT DOCUMENTS

| | | |
|---|---|---|
| 0 246 003 A2 | 11/1987 | (EP) . |
| 0 497 119 A1 | 8/1992 | (EP) . |
| 0 664 349 A1 | 7/1995 | (EP) . |
| 2 551 770 | 3/1985 | (FR) . |
| 2 157 600 | 10/1985 | (GB) . |
| WO 97/26388 | 7/1997 | (WO) . |

OTHER PUBLICATIONS

Patent Abstracts of Japan, vol. 013, No. 042 (C–564), Jan. 30, 1989 & JP 63 241154 A (Toshiba Corp), Oct. 6, 1988, Abstract.
Patent Abstracts of Japan, vol. 012, No. 139 (C–491), Apr. 27, 1988 & JP 62 253777 A (Mitsubishi Electric Corp), Nov. 5, 1987, Abstract.
Patent Abstracts of Japan, vol. 011, No. 206 (C–433), Jul. 3, 1987 & JP 62 027561 A (Mishima Kosan Co. Ltd.), Feb. 5, 1987, Abstract.

* cited by examiner

*Primary Examiner*—John Sheehan
*Assistant Examiner*—Andrew L. Oltmans
(74) *Attorney, Agent, or Firm*—Townsend and Townsend and Crew LLP

(57) ABSTRACT

The method for the production of a ceramic layer on a metallic base material combines the following measures: The base material is preheated. Ceramic coating material is applied to a locally melted surface region of the base material. The coating material is therein likewise melted. A metallurgical bonding zone is provided using an additive material which reacts with the coating material and which is additionally applied to the base material as an adhesion producing layer or is added to the base material as a component of the alloy.

11 Claims, 2 Drawing Sheets

METHOD FOR THE PRODUCTION OF A CERAMIC LAYER ON A METALLIC BASE MATERIAL

BACKGROUND OF THE INVENTION

1. Field of the Invention

The invention relates to a method for the production of a ceramic layer on a metallic base material, to an apparatus for carrying out the method and to workpieces manufactured in accordance with the method. The method in accordance with the invention can be used, for example, as a surface technology in turbine wheels (for the protection of the blades or blade tips in gas and steam turbines or in Pelton wheels) or in diesel engines (pistons, cylinder heads, valves).

2. Description of the Prior Art

Metallic surfaces can in principle be substantially improved with respect to various properties by means of ceramic coatings, namely, for example, with respect to their resistance to wear and/or to corrosion. The coating can also be used at higher temperatures as a heat insulating layer and as protection against wear. Pairing a ceramic material with a metallic one is very difficult due to the great differences between these materials. It is an object of the invention to apply a technically usable ceramic layer to a metallic base material by means of a suitable method and with a suitable choice of materials.

SUMMARY OF THE INVENTION

The method for the manufacture of a ceramic layer on a metallic base material combines the following measures: The base material is preheated. Ceramic coating material is applied to a locally melted surface region of the base material. In this situation, the coating material is likewise melted. A metallurgical bonding zone is produced by means of an additional material which reacts with the coating material and which is additionally applied to the base material as an adhesion producing layer or is admixed with the base material as a component of the alloy.

Thanks to the bonding zone in accordance with the invention the layer adheres well to the base material. Materials must be selected for which a bonding zone or an intermediate layer of this kind forms. In the choice of the materials care must further be taken that the ceramic layer has a suitable microstructure and that only low residual tensions remain between the layer and the base material. In particular, the production of a layer should be possible which is intact, i.e. largely free of tears, and compact, i.e. largely free of pores. For special applications porous coatings can also be advantageous. The method in accordance with the invention enables the manufacture of ceramic coatings of which the layer thicknesses are at least 0.1 mm, with it being possible for the layer thicknesses to be considerably greater.

The energy which is required for the melting of the ceramic coating material and for the piece of surface of the base material to be melted is advantageously introduced by means of a laser beam. Ceramic materials are very good absorbers in the infrared range so that a coating material present in powder form is preheated when flying through the laser beam.

The base material, including the adhesion producing layer where appropriate, forms the substrate. The laser is directed at this substrate. The powder particles which fly through the laser beam and are thereby preheated encounter a melt puddle formed by the laser beam in an interaction zone on the substrate. In the presence of an adhesion producing layer, the additional material at the surface of the substrate is transported in the interaction zone through convection and diffusion partially into the base material and partially into the coating material, where it forms transition regions as a result of metallurgical reactions which mechanically stably bond the base material to the ceramic coating after the subsequent solidification of the melt puddle.

The base material is advantageously a ferrite steel with low carbon content. A Martensite formation is largely absent during the cooling of a steel of this kind.

A specific coating method will be explained in the following:

A mixture of $Al_2O_3$ and $ZrO_2$ is used as a coating material, advantageously in a relationship of the two oxides for which a eutectic results (42% $ZrO_2$ by weight) so that the melting point of the layer takes on a minimum value (about 1900° C.). This mixture has a relatively large coefficient of thermal expansion for ceramic materials, namely about 8 $10^{-6}$ $K^{-1}$. A steel is used as a base material, the coefficient of thermal expansion of which is relatively small in comparison with other metals, namely a superferritic steel (X1 CrNiMo, coefficient of thermal expansion: 10.5 $10^{-6}$ $K^{-1}$, melting point 1485° C.; composition in percent by weight: 0.003 C, 28.35 Cr, 3.35 Ni, 2.37 Mo, 0.38 Si, 0.37 Mn, remainder Fe). It is important that the coefficient of thermal expansion of the superferritic steel is somewhat greater than that of the ceramic layer in order that the coating is under a compression force after the cooling down. Titanium (Ti) is chosen for the adhesion producing layer.

Titanium as an adhesion producing layer can be applied to the base material by means of PVD (Physical Vapor Deposition). The application of the coating must be carried out screened off from oxygen and nitrogen, i.e. in a protective gas (Ar).

When the substrate melts, Ti diffuses out of the adhesion producing layer into the base material and into the oxide incident at the interaction zone. Oxygen proceeds from the oxide into the melted adhesion producing layer and oxidizes Ti there, whereas zirconium oxide ($ZrO_2$) is partially reduced in a boundary region of the ceramic coating material. Assimilations of the chemical compositions thereby result in a transition region between the substrate and the coating. This transition region forms a mechanically stable bonding zone.

In the adhesion producing layer the Ti can be partially or wholly replaced by Zr or Hf. Other alloys also come into consideration as base materials which have relatively low coefficients of thermal expansions and melting points which do not differ greatly from those of the ceramic layer. One can, for example, use a ferritic construction steel. In this case the adhesion producing layer must be relatively thick (several hundredths of a millimeter) so that a volume increase through Martensite-wise conversions acts to a reduced extent on the ceramic layer. MeCrAlY (with Me=Fe, Ni, Co) can be used as a material for the adhesion producing layer which can be applied by means of laser coating. It is ideal if the values for the coefficients of thermal expansion and the melting temperatures are located between the corresponding values for the base material and the ceramic coating in the bonding zone.

For a successful production of a coating which adheres to the base material in accordance with the invention as a result of a bonding zone it is necessary, in addition, that the substrate be preheated. The heat required for the preheating is advantageously introduced inductively by means of electromagnetic energy. Preheating is done to a temperature $T_G$, with the absolute temperature $T_G$ being greater than about 50% of the melting temperature $T_m$ of the base material.

The coating manufactured in accordance with the invention is also resistant to thermal shock. Relatively large temperature gradients between the coating and the base material are possible without a breaking off of the ceramic layer arising.

DETAILED DESCRIPTION OF THE PREFERRED EXEMPLARY EMBODIMENTS

Figure 1:
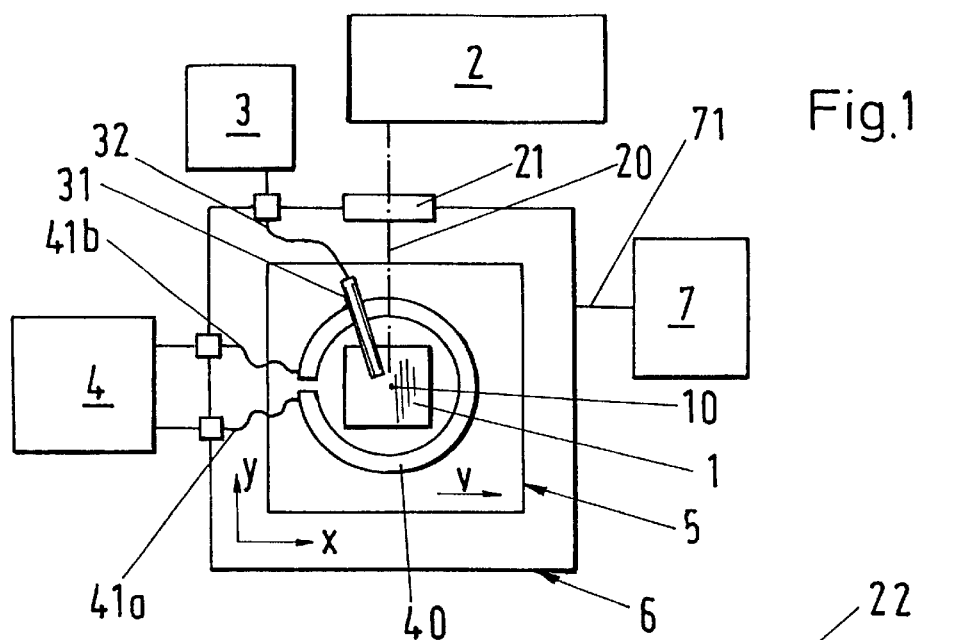
FIG. 1 is a schematic illustration of a first apparatus for the manufacture of the coating in accordance with the invention.

The apparatus in FIG. 1 comprises the following components: a workpiece 1 to be coated, a laser system 2, a powder dispenser 3 (reservoir inclusive of forwarder), an energy source 4 for an induction heater, an apparatus 5 for moving the workpiece 1, a tightly closing container 6 and a reservoir 7 for a protective or inert gas. Coating material in powder form is applied via a hose 32 and a nozzle 31 to an interaction zone 10 on the workpiece 1 under the action of a laser beam 20. At the same time, heat is produced inductively in the workpiece 1 by means of an electrode 40 which is connected to an energy source 4 via electrical lines 41a and 41b. The workpiece 1 is moved by the apparatus 5 at an advancing speed v in the x direction so that a uniform trail 12 of applied material 30 arises. Through displacement of the workpiece 1 in the y direction an array of further trails can be manufactured in parallel and close arrangement. The electrode 40 of the induction heater can be arranged to be fixed in space depending on the size of the workpiece 1; it can, however, also be moved along with the workpiece 1. The container 6, in which the coating is carried out in a protective gas atmosphere, is connected to the gas reservoir 7 via a line 71. A window 21 in the wall of the container 6 allows the (infrared) laser beam to pass.

A control apparatus (not shown) can also be provided by means of which process parameters, in particular, the advancing speed of the movable holder 5, can be regulated as a result of temperature measurements at and on the workpiece 1. The cooling down of the base material can be controlled using the control apparatus in such a manner that the cooling down speeds of the base material and of the coating are of the same order of magnitude, i.e. do not differ by more than a factor of five.

Figure 2:
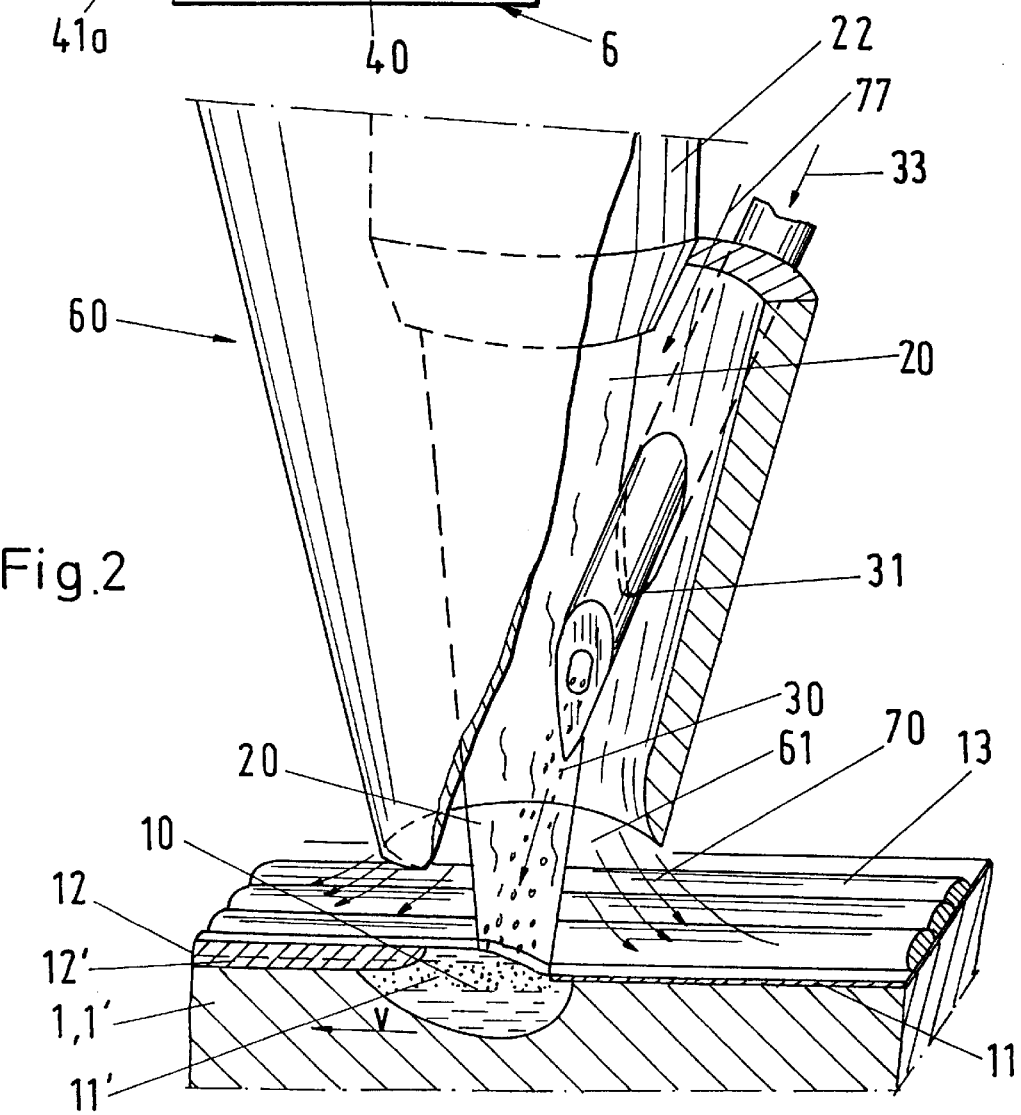
FIG. 2 is a part of a second apparatus, namely a nozzle for supplying a protective gas into which a second nozzle for a powder injection is integrated.

Instead of in the protective gas atmosphere of the container 6, it is advantageous to carry out the method in accordance with the invention by means of a suitably formed protective gas nozzle 60—see FIG. 2: a large nozzle 60 for the supply of the protective gas 77 within which space is provided for the laser beam 20, and a small nozzle 31, with coating material 33 consisting of powder particles 30 being supplied using the small nozzle 31. The protective gas 77 is guided in the form of a laminar flow to the nozzle opening 61 in a ring gap between the wall of the large nozzle 60 and a tube piece 22 from which the laser beam 20 emerges. After it emerges from the nozzle opening 61 the protective gas 77—flowing further in a laminar manner—forms a barrier 70 against the surrounding air space. This barrier 70 is dimensioned in such a manner that a diffusing in of the surrounding air to the interaction zone 10 is suppressed. The parts of the apparatus which are located in the protective gas flow are suitably formed so that a laminar development of the flow of the protective gas 77 is ensured; in particular, the powder nozzle 31 is formed in a streamlined shape.

The workpiece 1 is coated with an adhesion producing layer 11 of a material with which a bonding zone 12' can be produced in accordance with the invention. In the melting puddle of the interaction zone 10, this material distributes itself in a region 11' indicated by dots; in this situation, it combines on the one hand with the base material 1' and, on the other hand, with the incident coating material 30. Through the application of material onto the workpiece 1, which is moved at a speed v, a trail 12 arises which together with further trails applied parallel to it forms a connected coating material 30.

Figure 3:
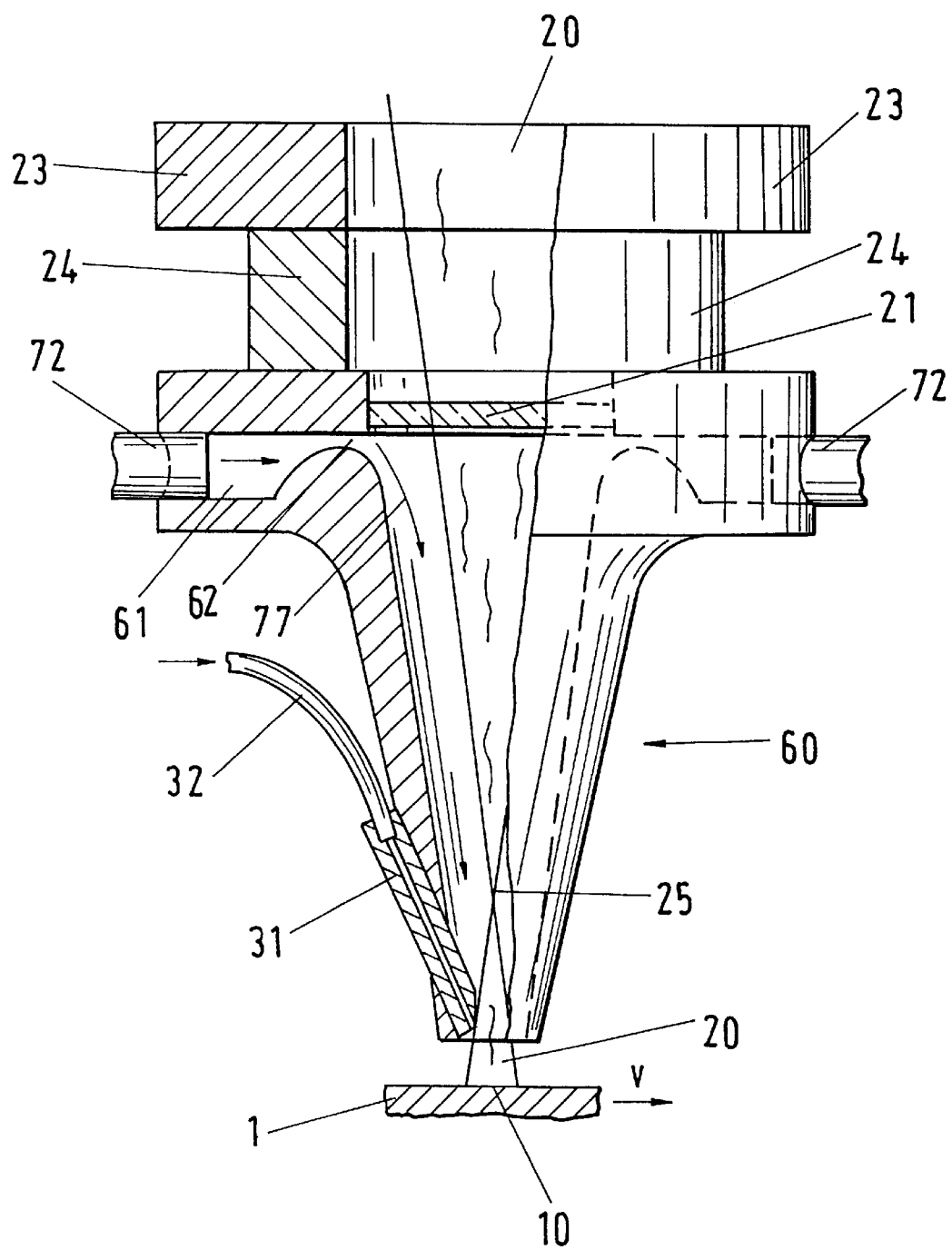
FIG. 3 is a second exemplary embodiment of the protective gas nozzle.

FIG. 3 shows a protective gas nozzle 60 with the following components: a flange 23, an intermediate ring 24, ZnSe windows 21 (transparent for infrared), protective gas connections 72, a ring passage 61, a gap-shaped passage aperture 62 and a powder nozzle 30 with a connection hose 31. In this example, the focus 25 of the laser beam 20 is located above the interaction zone 10 of the workpiece 1. The protective gas 77 is fed into the inner space of the nozzle 60 via the gap 62 in such a manner that a uniform laminar flow develops.

For the production in accordance with the invention of a bonding zone 12' it is not necessary that the additional material which is required for this, for example Ti, is applied in the form of an adhesion producing layer 11 (see FIG. 2) which must be manufactured with the ceramic material 30 in a separate step prior to the coating. It is also possible to introduce the additional material into the interaction zone 10, for example, together with the ceramic material or by means of a second powder nozzle (not shown) immediately prior to the application of the ceramic material 30. A further possibility consists in adding the additional material during the casting of the base material for the manufacture of a cast part. The additional material can also be a constituent of an intermediate layer.

Particles can also be added to the ceramic coating material 30 which are chemically largely stable with respect to liquid melt phases arising in the coating procedure. These particles can consist of hard ceramic materials such as carbides, nitrides, borides and/or oxides or can be enveloped in resistant protective coatings. Particles of this kind can serve for the improvement of the wear resistance. The particles are admixed to the powder of the coating material; they can however also be introduced into the laser induced melt puddle by a separate powder supply.

The method in accordance with the invention can be used to manufacture coatings for protection against thermo-mechanical or chemically corrosive stressing, for example, for the protection of turbine wheels. Heat insulation at higher temperatures and wear protection are further possible uses.

What is claimed is:

1. A method for the manufacture of a ceramic layer on a metallic base material, the method comprising:

holding the base material at an elevated temperature;

applying a ceramic coating material to a locally melted surface region of the base material;

applying an additive material to the base material as an adhesion promoting layer; and melting the ceramic coating material so that a metallurgical bonding zone forms with the additive material;

wherein the coating material and the surface to be coated are melted at the same time by means of a laser beam, with the laser beam being directed toward a place on the surface to be coated, and wherein the coating material is forwarded through the laser beam in powder form.

2. A method in accordance with claim 1 comprising additionally applying a further material to the base material for the production of the bonding zone by means of a separate method step by an application of one of a vapor phase or thermal spraying.

3. A method in accordance with claim 1 further comprising additionally applying a further material to the base material for the production of the bonding zone by means of a separate method step by an application of a laser coating.

4. A method in accordance with claim 1 wherein the application of coating material is performed in a laminarly flowing protective gas with a diffusion of air from the surroundings to places to be coated being largely suppressed by means of the gas flow.

5. A method in accordance with claim 1 further comprising controlling cooling down of the base material by means of a control apparatus in such a manner that cooling rates of the base material and of the ceramic layer are of the same order of magnitude.

6. A method in accordance with claim 1 wherein the cooling rates of the base material and of the ceramic layer do not differ by more than a factor of five.

7. A method for the manufacture of a ceramic layer on a metallic base material, the method comprising:

preheating the base material to a temperature $T_G$;

holding the base material at an elevated temperature;

applying a ceramic coating material to a locally melted surface region of the base material;

applying an additive material to the base material as an adhesion promoting layer; and melting the ceramic coating material so that a metallurgical bonding zone forms with the additive material;

wherein the ultimate value of $T_G$ is greater than about 50% of a melting temperature $T_M$ of the base material; and wherein the base material is preheated by introducing electromagnetic energy inductively into the base material.

8. A method for the manufacture of a ceramic layer on a metallic base material, the method comprising:

preheating the base material to a temperature $T_G$;

holding the base material at an elevated temperature;

applying a ceramic coating material to a locally melted surface region of the base material;

applying an additive material to the base material as an adhesion promoting layer; and melting the ceramic coating material so that a metallurgical bonding zone forms with the additive material;

wherein the ultimate value of $T_G$ is greater than about 50% of a melting temperature $T_M$ of the base material;

wherein the base material is preheated by introducing electromagnetic energy inductively into the base material; and wherein the coating material and the surface to be coated are melted at the same time by means of a laser beam, with the laser beam being directed toward a place on the surface to be coated, and wherein the coating material is forwarded through the laser beam in powder form.

9. A method for the manufacture of a ceramic layer on a metallic base material, the method comprising:

holding the base material at an elevated temperature;

applying a ceramic coating material to a locally melted surface region of the base material;

adding an additive material to the base material as a component of an alloy;

reacting the additive material with the coating material; and melting the ceramic coating material so that a metallurgical bonding zone is formed with the additive material;

wherein the coating material and the surface to be coated are melted at the same time by means of a laser beam, with the laser beam being directed toward a place on the surface to be coated, and wherein the coating material is forwarded through the laser beam in powder form.

10. A method for the manufacture of a ceramic layer on a metallic base material, the method comprising:

preheating the base material to a temperature $T_G$;

holding the base material at an elevated temperature;

applying a ceramic coating material to a locally melted surface region of the base material;

adding an additive material to the base material as a component of an alloy;

reacting the additive material with the coating material; and melting the ceramic coating material so that a metallurgical bonding zone is formed with the additive material;

wherein the ultimate value of $T_G$ is greater than about 50% of a melting temperature $T_M$ of the base material; and wherein the base material is preheated by introducing electromagnetic energy inductively into the base material.

11. A method in accordance with claim 10, wherein the coating material and the surface to be coated are melted at the same time by means of a laser beam, with the laser beam being directed toward a place on the surface to be coated, and wherein the coating material is forwarded through the laser beam in powder form.

* * * * *